(12) United States Patent
Mathys et al.

(10) Patent No.: US 7,393,173 B2
(45) Date of Patent: Jul. 1, 2008

(54) SHELF OPERATING DEVICE

(75) Inventors: Andre Mathys, Ennetburgen (CH); Hans Koller, Horw (CH)

(73) Assignee: Manitec Consulting AG, Horw (CH)

( * ) Notice: Subject to any disclaimer, the term of this patent is extended or adjusted under 35 U.S.C. 154(b) by 217 days.

(21) Appl. No.: 10/526,534

(22) PCT Filed: Sep. 18, 2003

(86) PCT No.: PCT/CH03/00628

§ 371 (c)(1),
(2), (4) Date: Mar. 3, 2005

(87) PCT Pub. No.: WO2004/028930

PCT Pub. Date: Apr. 8, 2004

(65) Prior Publication Data

US 2006/0182547 A1    Aug. 17, 2006

(30) Foreign Application Priority Data

Sep. 25, 2002   (CH) ..................... 1615/02

(51) Int. Cl.
  *B65G 1/06*   (2006.01)
(52) U.S. Cl. .................................... 414/266
(58) Field of Classification Search ................ 414/278, 414/280, 266, 277, 276
See application file for complete search history.

(56) References Cited

U.S. PATENT DOCUMENTS

| | | | |
|---|---|---|---|
| 4,394,104 A | | 7/1983 | Camerini et al. |
| 4,394,894 A | * | 7/1983 | Gemmani ................. 198/339.1 |
| 5,071,305 A | * | 12/1991 | Curti ........................... 414/157 |
| 5,613,828 A | * | 3/1997 | Haddow et al. ........... 414/798.9 |
| 5,749,453 A | * | 5/1998 | Doornekamp et al. ....... 198/400 |
| 6,024,533 A | * | 2/2000 | Redden .................... 414/798.9 |
| 6,382,897 B2 | * | 5/2002 | Mattio et al. .............. 414/331.1 |
| 6,446,784 B1 | * | 9/2002 | Veldhuizen et al. .......... 198/399 |
| 6,491,155 B2 | * | 12/2002 | Garioni .................... 198/803.7 |
| 6,557,695 B2 | * | 5/2003 | Gerber et al. ............. 198/473.1 |

(Continued)

FOREIGN PATENT DOCUMENTS

DE    3324349 C1    11/1984

(Continued)

*Primary Examiner*—Charles A Fox
(74) *Attorney, Agent, or Firm*—Browdy and Neimark

(57) ABSTRACT

The invention relates to a shelf operating device comprising at least one continuous drive element (13) which is guided about two wheels (12, 13) which are arranged at a distance from each other, also comprising an upper strand and a lower strand. At least one gripping means (40, 41) is provided in order to grip a container (2) or a pallet. The gripping means (40, 41) describes a path which extends on deflection areas of the above-mentioned (11, 12) above the path of the drive element (13). The engaging means (40, 41) is embodied in a manner similar to that of forceps and guided such that it executes a lateral movement in order to grip the container (2) or the pallet. Preferably, the gripping means (40, 41) comprises two engaging arms (18, 24; 18', 24') which are pivotably mounted and which can be pivoted towards each other in order to grip in a manner similar to that of forceps. Most commercially available containers (2) and pallet can be stored and removed from storage by using said shelf operating device.

7 Claims, 8 Drawing Sheets

U.S. PATENT DOCUMENTS 6,629,403 B1 * 10/2003 Tisma ................. 53/502
6,654,663 B1 * 11/2003 Jokela ................ 700/230
2002/0041801 A1 * 4/2002 De Greef ............. 414/499

FOREIGN PATENT DOCUMENTS

| | | |
|---|---|---|
| DE | 3830373 A1 | 3/1989 |
| DE | 4233690 A1 | 4/1994 |
| DE | 19501883 A1 | 8/1995 |
| EP | 0332313 A1 | 6/1989 |
| WO | WO 01/10751 A1 | 2/2001 |

* cited by examiner

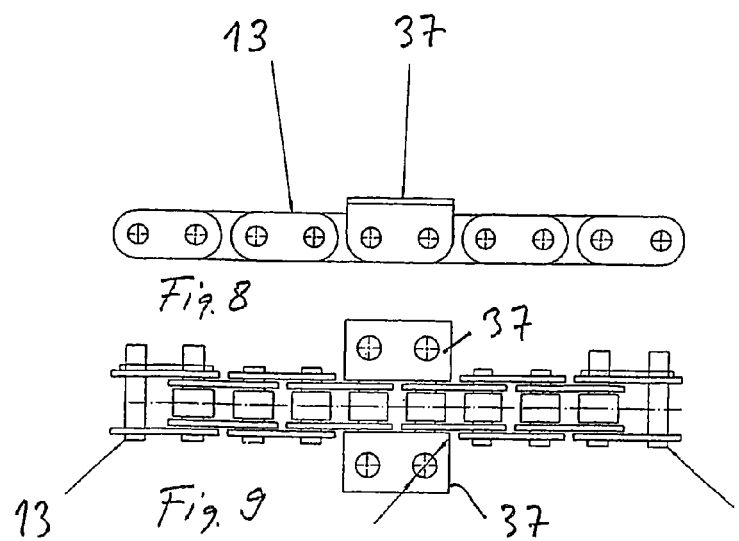
Fig. 8
Fig. 9
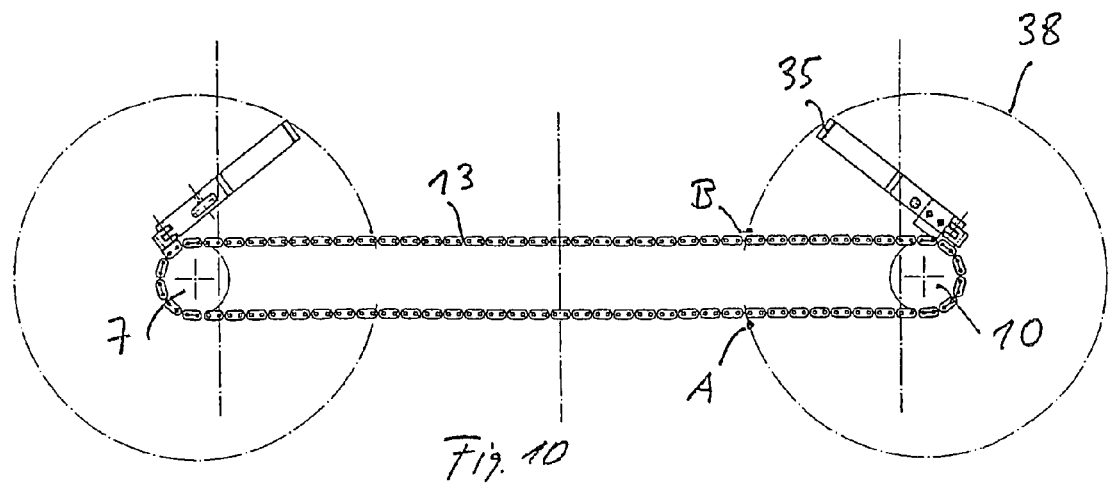
Fig. 10

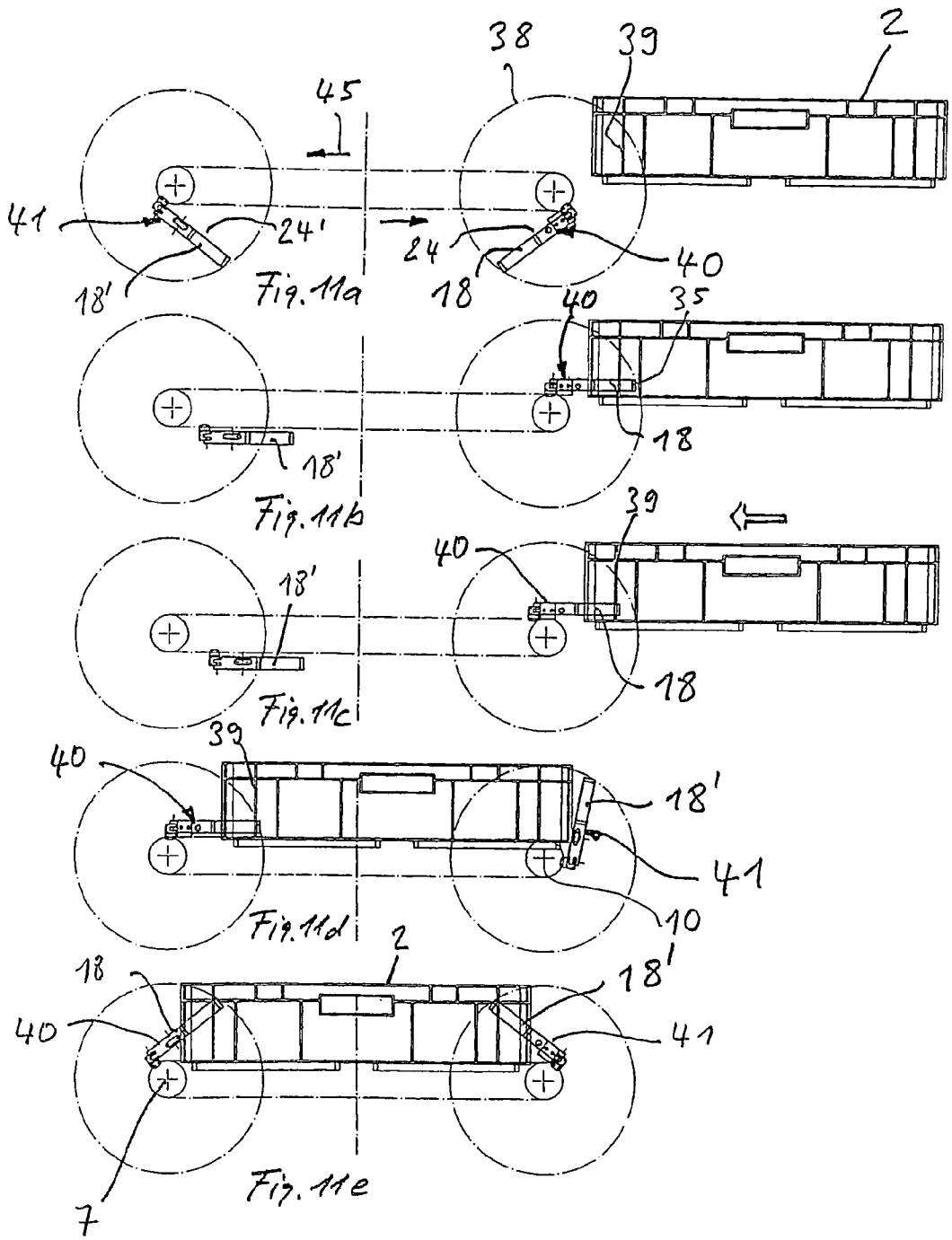

SHELF OPERATING DEVICE

BACKGROUND OF THE INVENTION

1. Technical Field of the Invention

The invention relates to a storage and retrieval unit for storing and removing from store containers or pallets belonging to a rack, having at least one endless drive element which is led around two wheels arranged at a distance from each other and has an upper run and a lower run and on which at least one gripping means for gripping a container or a pallet is arranged.

2. Prior Art

Storage and retrieval units of this type are known for picking up and depositing loads in racks. The storage and retrieval unit is arranged on a vehicle which, for example, can be moved horizontally and vertically on rails between racks. Using the storage and retrieval unit, containers or pallets are loaded onto the vehicle and put into store from the vehicle at the envisaged storage space in the rack. Important in such storage and retrieval units are a high throughput, a low demand for space and the greatest possible precision when picking up and depositing the containers or pallets.

A storage and retrieval unit of the aforementioned type has been disclosed by WO 01/10751 from the applicant. This has gripping arms which are inclined with respect to the pulling direction of the endless drive element and which each have a cam which moves into a vertical groove in the pallet in order to grip a container or a pallet. As a container or a pallet is gripped, the cam moves into the groove from below. As the container or the pallet is deposited, the cam moves upward out of the groove again. In practice, the storage and retrieval unit has proven to be extremely worthwhile. For this storage and retrieval unit, an appropriate container or a pallet which has the aforementioned appropriate adapted groove is necessary. Previously usual containers cannot generally be used here.

EP-A-0 322 313 discloses a storage and retrieval unit in which a gripping means is likewise provided which, at an outer end, has a cam which moves into a groove in a container. Commercially available containers or pallets cannot be used in this storage and retrieval unit either. This is likewise true of the storage and retrieval unit according to DE-A-195 01 893. DE-A-42 33 690 discloses a storage and retrieval unit in which, in order to grip a container, a gripper engages fully in a groove in the container. This storage and retrieval unit can only be moved vertically between stored containers, since it would collide with the containers in the event of a horizontal movement. In addition, this storage and retrieval unit also requires a specific container.

OBJECT AND SUMMARY OF THE INVENTION

The invention is based on the object of providing a storage and retrieval unit of the aforementioned type with which even commercially available containers or pallets can be stored and removed from store. The storage and retrieval unit is additionally to be constructionally comparatively simple and capable of being produced economically. Nevertheless, the storage and retrieval unit is to be functionally reliable.

In a storage and retrieval unit according to the invention, the object is achieved in that the gripping means is formed in the manner of tongs and is guided in such a way that it carries out a lateral movement in order to grip a container or a pallet. Using such a storage and retrieval unit, any container or any pallet that has a protruding rib or depression at the side can be handled. By far the majority of containers have such ribs, at least on the sides, which are used here as a stiffening rib. In principle, however, a frictional connection to the container is also possible, so that even containers that are flat on the outside can be stored and removed from store.

According to a development of the invention, the gripping means has two arms mounted at a distance from each other, which carry out a pivoting movement when gripping and depositing a container or a pallet. According to a development of the invention, this pivoting movement is controlled by means of at least one rail which is fixed to a frame of the storage and retrieval unit. Two such rails are preferably provided, one rail controlling a first gripping means and the second rail controlling a second gripping means. The first gripping means grips a container on the pallet in order to load it onto the storage and retrieval unit, and the second gripping means pushes the container off the storage and retrieval unit, for example into a store. Once the container or the pallet is on the storage and retrieval unit, it is guided by both gripping means.

According to a development of the invention, the gripping means has two gripping arms, the movement of one gripping arm being transmitted to the other gripping arm by means of a tie rod. The two gripping arms are additionally preferably mounted on a common connecting rod. This results in a simple and nevertheless stable and reliable construction.

According to a development of the invention, the gripping means in each case have at least one rod which is positioned in such a way that it pushes the container as the latter is deposited.

Further advantageous features emerge from the dependent patent claims, the following description and the drawing.

BRIEF DESCRIPTION OF THE DRAWINGS

An exemplary embodiment of the invention will be explained in more detail in the following text by using the drawing, in which:

FIG. 8 shows a section of an endless drive element, FIG. 9 shows a further view of the section according to FIG. 8, FIG. 10 shows in schematic form a view of the endless drive element having two gripping means and FIGS. 11a to 11e show in schematic form individual steps when pulling a container onto the storage and retrieval unit.

DETAILED DESCRIPTION OF THE PREFERRED EMBODIMENT(S) OF THE INVENTION

Figure 1:
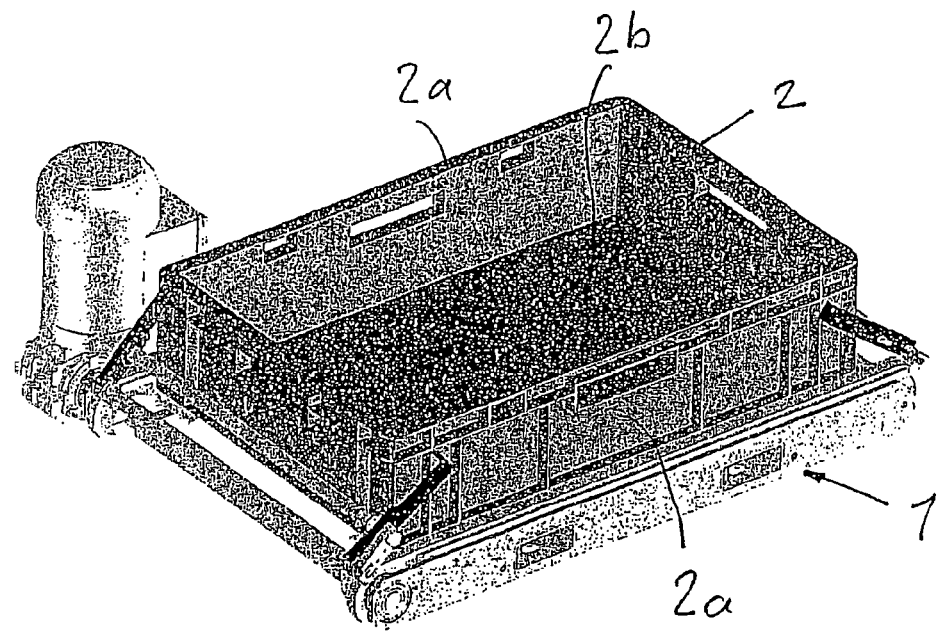
FIG. 1 shows in schematic form a three-dimensional view of a storage and retrieval unit according to the invention with a container.

The storage and retrieval unit 1 shown in FIG. 1 is mounted on a vehicle, not shown here, which can be moved in gangways in a rack in order to pick up and deposit at least one container 2. The vehicle can also have a plurality of storage and retrieval units 1, for example two storage and retrieval units 1 arranged beside each other. In FIG. 1, the storage and retrieval unit 1 is loaded with a container 2. The container 2 is a normal container made of plastic and has parallel side walls 2a and a base 2b. Instead of the container 2, the storage and retrieval unit 1 can also be loaded with a pallet, not shown here. The container 2 is used to hold the goods, not shown here, which are to be put into store or removed from store.

Figure 2:
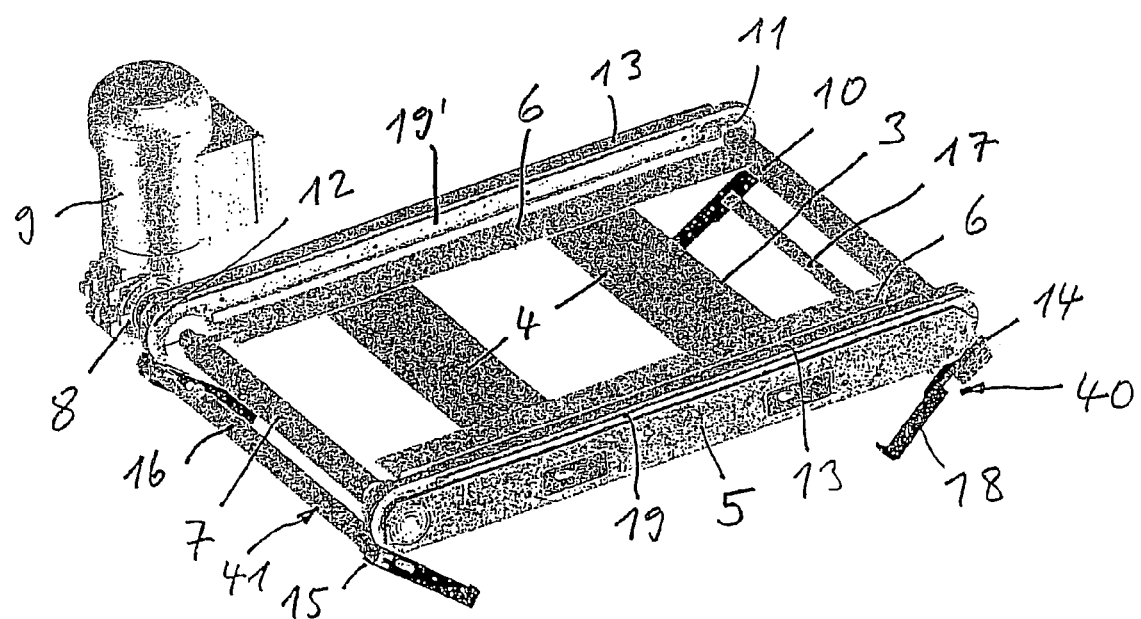
FIG. 2 shows the view according to FIG. 1 but without a container.
Figure 3:
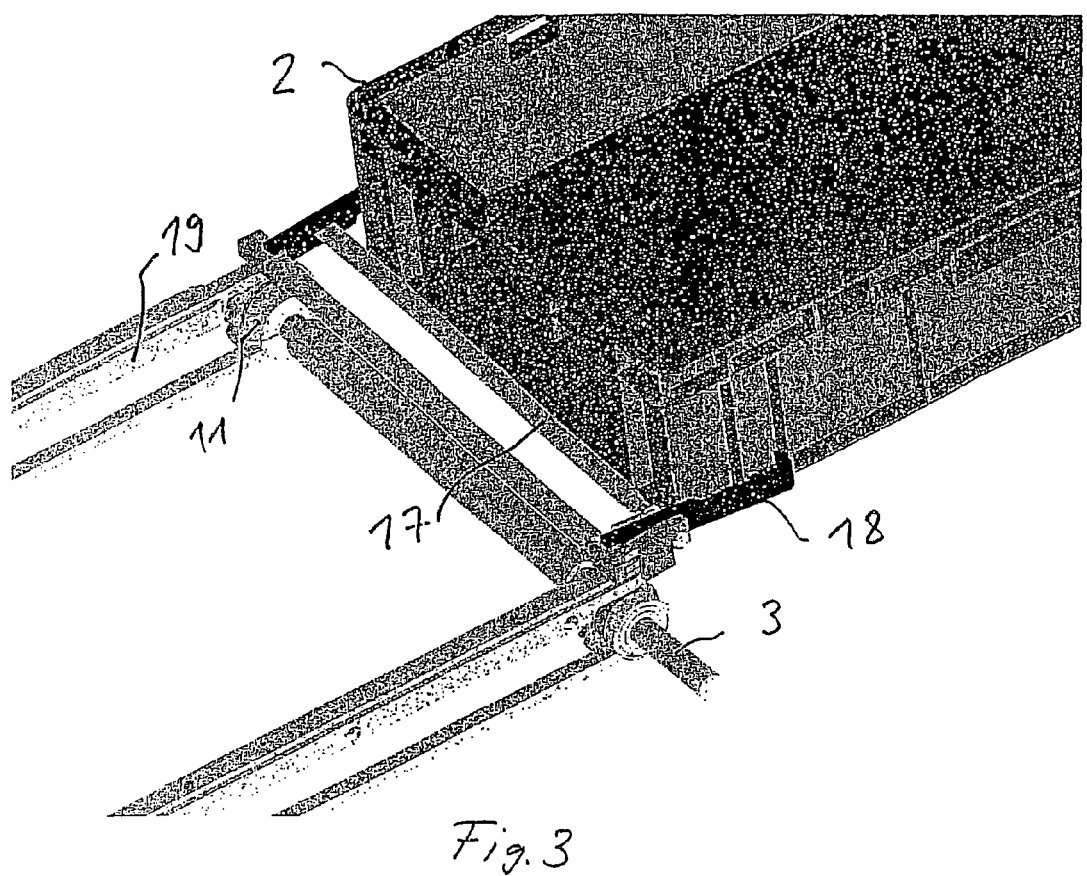
FIG. 3 shows in schematic form the gripping of a container.

According to FIG. 2, the storage and retrieval unit 1 has a frame 3 which has two crossmembers 4 to which two opposite bearing plates 5 are fixed. Mounted on the bearing plates 5 is a drive shaft 7 which is driven via a gear mechanism 8 by a motor 9, in particular an electric motor. Also mounted on the bearing plates 5 is an axle 10 on which two chain wheels 11 are fixed, around which in each case an endless drive element 13, for example a link chain, is placed. These two drive elements 13 are driven by the shaft 7, which likewise has two chain wheels 12. Also fixed to the frame 3 are two sliding rails 6, which are arranged at a distance from each other and run parallel to each other. These sliding rails 6 are L-shaped in cross section and are used to guide the container 2.

Figure 5:
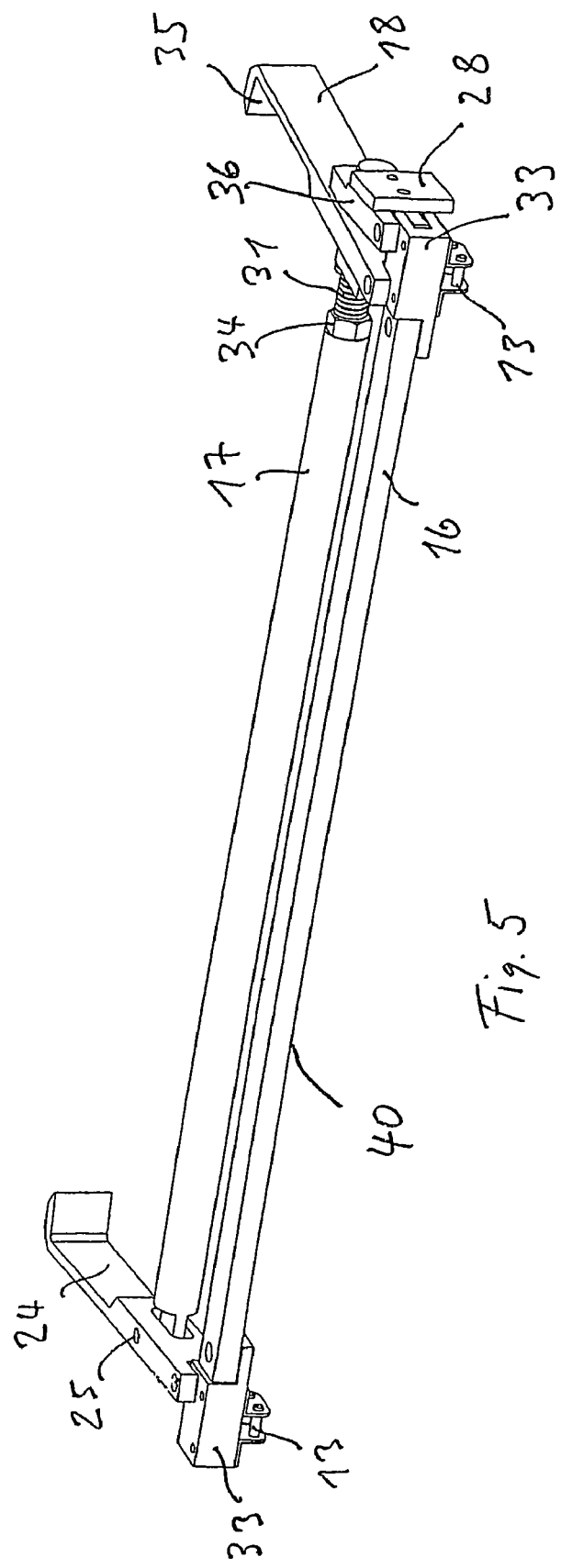
FIG. 5 shows a three-dimensional view of a gripping means.

In order to pick up and deposit the container 2, the storage and retrieval unit has two gripping means 40 and 41, which are constructed substantially identically and which are fixed at a distance from each other on the two endless drive elements 13. FIG. 5 shows the gripping means 40, but the gripping means 41 is constructed identically. At the ends of a loadbearing rod 16 in each case a support 33 is fixed, which is in turn fixed to two fixing lugs 37, for example screwed on. According to FIGS. 8 and 9, these fixing lugs 37 are movable connecting parts of a drive element 13. According to FIGS. 8 and 9, the drive element 13 is an intrinsically normal link chain. However, a toothed belt, for example, could also be used instead of the link chain 13.

Figure 6:
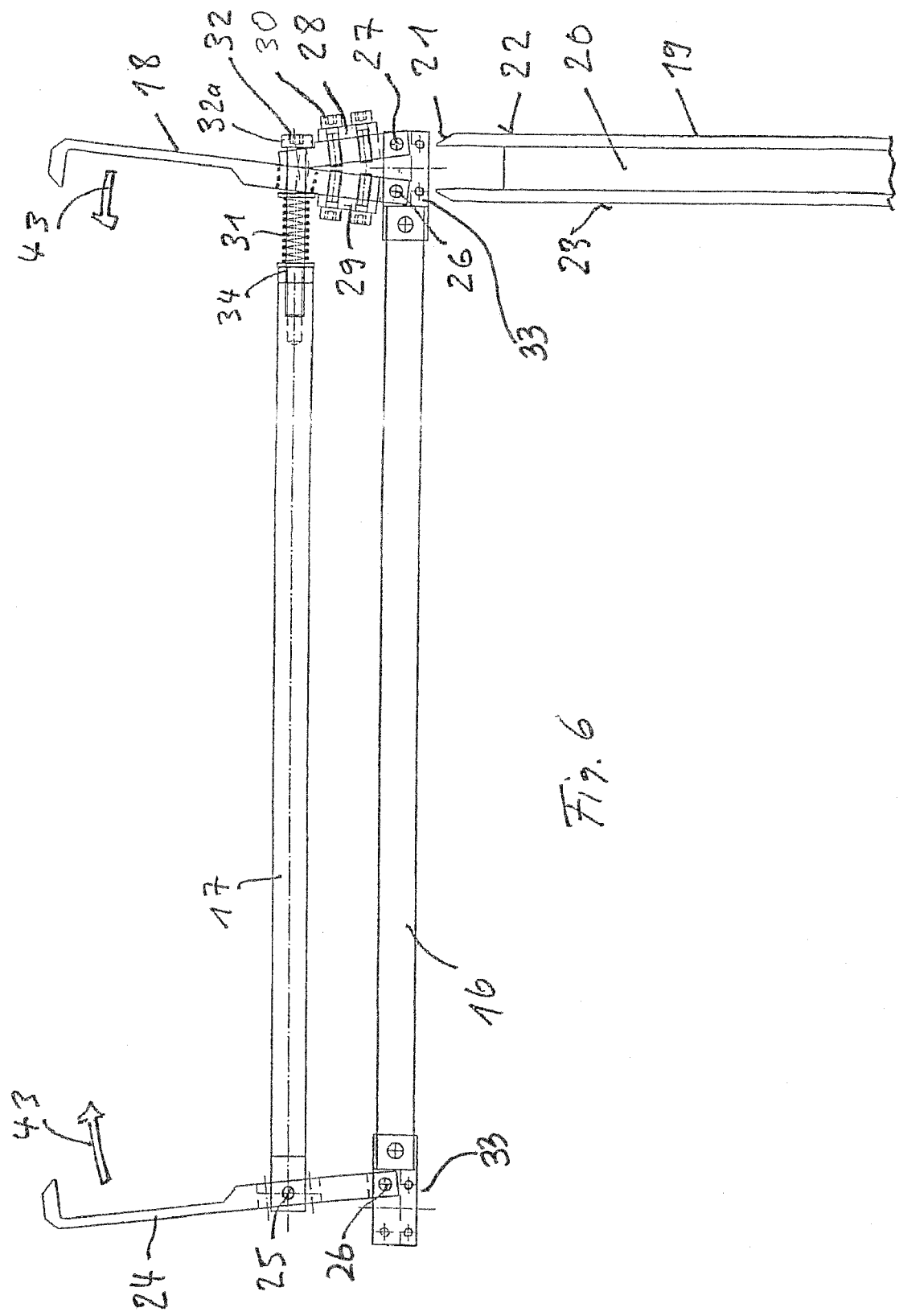
FIG. 6 shows a further view of the gripping means according to FIG. 5.

As shown in FIG. 6., on each support 33 is a gripping arm 18 and 24, respectively, which can be pivoted to a limited extent about an axle 24, 24, respectively. By means of a tie rod 17, the two gripping arms 18 and 24 are connected to each other. The tie rod 17 is connected to the gripping arm 24 by a rotary joint 25. The tie rod 17 is connected to the gripping arm 18 by a threaded bolt 32, which is screwed into the tie rod 17 and is fixed by a nut 34. Between the nut 34 and the gripping arm 18, a compression spring 31, which is supported on the nut 34. The gripping arm 18, is arranged on the threaded bolt 32. The gripping arm 18 has a through hole 42, through which the threaded bolt 32 is pushed loosely.

Figure 4:
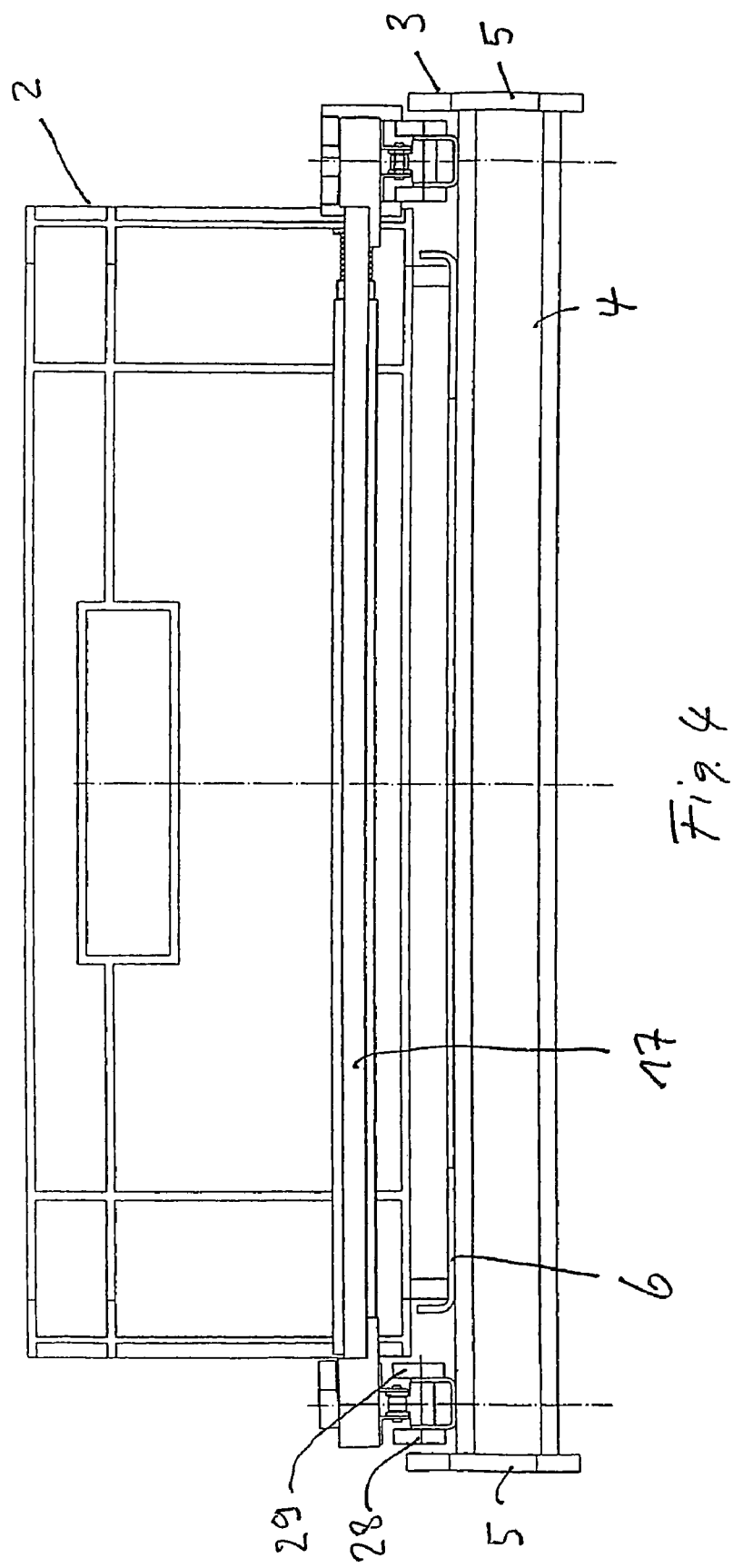
FIG. 4 shows a front view of the storage and retrieval unit with a container.

As shown in FIGS. 5 and 6, also arranged on the support 33, is a pulling element 36 which can be pivoted about a rotary bearing 27. The threaded bolt 32 passes through the pulling arm 36 and rests with a head 32a on the outside of the pulling element 36. Fixed to the pulling element 36 and also to the gripping arm 18 by means of fixing screws 30 is a control plate 28 and 29, respectively, which in each case projects downward, as shown in particular by FIG. 4. These two control plates 28 and 29 interact with the control rail 19 in order to pivot the two gripping arms 18 and 24. The other gripping means 41 interacts in the same way with the other parallel, opposite guide rail 19'.

The guide rails 19 and 19' each have a channel 20, which is open at both ends and in which one of the two endless drive elements 13 is guided. The two gripping elements 40 and 41 are moved by the drive elements 13. By means of the guide rails 19, the gripping means 40 and 41 are in each case actuated one after another in such a way that the two gripping arms 18 and 24 are pivoted from the spread arrangement shown in FIG. 6 in the direction of the arrows 43 into the parallel arrangement shown in FIG. 7. This is achieved by the two control plates 28 and 29 running onto the control surfaces 21 running obliquely outward and shown in FIG. 6 and, as a result, being displaced in parallel. As a result, the gripping arm 18 is pivoted about the rotary joint 26 and, at the same time, the pulling element 36 is pivoted about the rotary joint 27. Here, the pulling element 36 takes the threaded bolt 32 with it and, as a result, the other gripping arm 24 is pivoted into the parallel position by the tie rod 17. The compression spring 31 is tensioned hereby. In the region of the guide rail 19, the two control plates 28 and 29 are placed on the outside of control surfaces 22 and 23. In the region of the guide rail 19, the two gripping arms 18 and 24 are thus aligned parallel to each other, according to FIG. 7. At the other end of the guide rail 19, the two control plates 29 and 28 are free again and, by means of the pressure of the tensioned spring 31, these can be pivoted again into the position shown in FIG. 6. The two gripping arms 18 and 24 are therefore spread out again. As they move onto this horizontally extending guide rail 19 or guide rail 19', the gripping arms 18 and 24 execute a tongs-like closing movement. As they leave the guide rail 19 and 19', the tongs are opened again in opposing movements. If the gripping means 40 and 41 are outside the region of the guide rail 19 or 19', then the gripping arms 18 and 24 are opened, according to FIG. 6. The aforementioned opening and closing is in each case carried out at the ends of the guide rail 19 and 19', specifically in each case when the gripping arms 18 and 24 are aligned horizontally.

Figure 7:
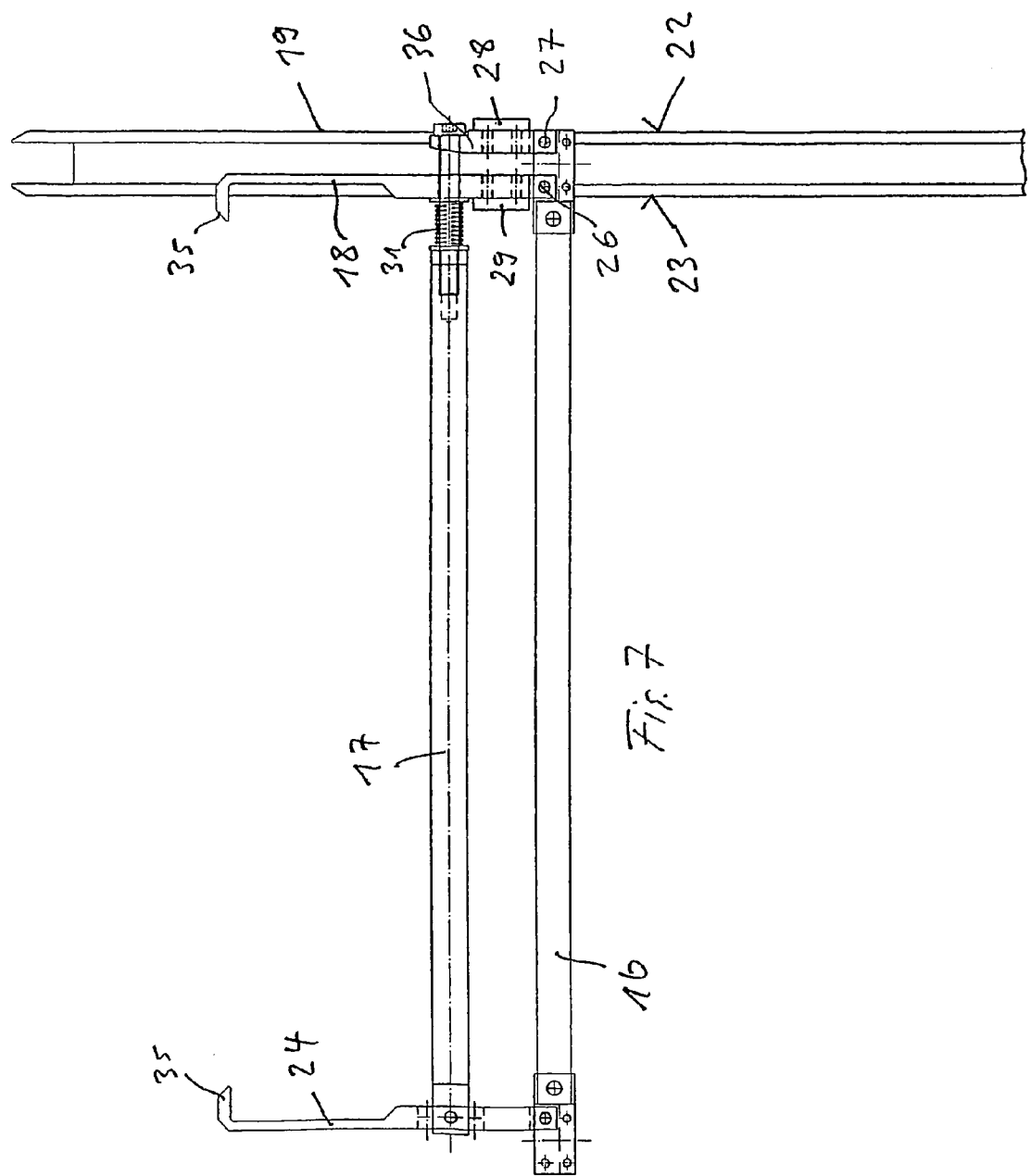
FIG. 7 shows a further view of the gripping means.

As shown in FIGS. 5, 7 and 10, on the two gripping arms 18 and 24, in each case at the free end, a gripping finger 35 that projects inward is integrally molded. These gripping fingers 35 are respectively moved toward each other and away from each other as the gripping arms 18 and 24 are pivoted. The distance between the gripping fingers 35 is thus reduced or enlarged. The gripping fingers 35 can be designed differently. In principle, an embodiment would also be conceivable in which the gripping fingers 35 are replaced by friction plates or magnets or the like.

The operation of the storage and retrieval unit according to the invention will be explained in more detail by using FIGS. 11a to 11e.

In FIG. 11a, a container 2 is ready to be picked up. The two gripping means 40 and 41 are located outside the region of the guide rails 19 and 19' and are therefore open according to FIG. 6. If then, from this rest position, the endless drive elements 13 are driven in the direction of the arrow 45, the two gripping means 40 and 41 run with it in the same direction and ultimately reach the arrangement shown in FIG. 11b, in which these extend horizontally. The gripping means 40 is in this case not yet in engagement with the guide rail 19, and the two gripping arms 18 and 24 thus remain open according to FIG. 6. The two gripping fingers 35 are in each case arranged in front of a rib 39 belonging to the container 2. These ribs 39 extend vertically and protrude laterally.

During an onward movement, the gripping means 40 then comes into engagement with the guide rail 19 and, as a result, the two gripping arms 18 and 24 are pivoted and moved into the closed position shown in FIG. 7. The two gripping fingers 35 are thus moved inward toward the container 2. They ultimately engage behind a rib 39 in each case and rest on the latter. The container 2 is therefore gripped by the gripping means 40 and is finally picked up onto the storage and retrieval unit 1, until the position shown in FIGS. 1 and 11e is reached. In the position according to FIG. 11d, the gripping means 41 is pivoted about the axle 10 and finally comes into engagement with the guide rail 19'. The gripping arms 18' and 24' are therefore likewise closed in the manner of tongs and finally grip the container 2 in the position according to FIG. 11e. The container 2 has therefore been picked up onto the storage and retrieval unit 1 and is held by the two gripping means 40 and 41. The rod 17 of the gripping means 41 bears on the rear of the container 2 in FIG. 11e. During further transport, the rod 17 pushes the container 2 off the storage and retrieval unit. Once the storage and retrieval unit has been unloaded, it can be loaded with a further container. The container 2 can then be transported to the desired position by the vehicle.

In order to deposit the container 2, the drive elements 13 are moved again, so that the container 2 in FIG. 11e is optionally moved to the left or to the right. If the container 2 is moved to the left in FIG. 11e, the gripping means 40 opens first. Once the gripping means 41 reaches the drive shaft 7, this gripping means 41 is also opened and therefore the container is released. If the container 2 is moved to the right in FIG. 11e, the gripping means 41 opens first and finally the gripping means 40. During both tongs-like movements, the gripping fingers 35 in each case describe a circular path 38, as indicated in FIG. 10 by a dashed line 38. However, on account of the tongs-like movement of the gripping arms 18 and 24, such a circular path is not imperative. The gripping arms 18 and 24 could also be guided in parallel. The two end points of these paths are indicated by A and B in FIG. 10. Once the gripping fingers 35 are in the region of the end points A and B, the gripping arms 18 and 24 are aligned horizontally. Outside these positions, the gripping arms 18 and 24 and 18' and 24' extend tangentially with respect to the drive shaft 7 toward the axle 10.

In order to pick up and to deposit the container 2 as explained above, only ribs 39 or recesses which protrude laterally are required on said container. Such ribs 39 are possessed by most commercially available containers which are provided for storage frames. In principle, the ribs 39 can also be replaced by openings or depressions. In principle, it is also possible to grip the container 2 frictionally. This is required when the outer side of the container is flat. In this case, the gripping fingers 35 could be replaced by a rubber plate or the like. Finally, an embodiment is conceivable in which the gripping means 40 and 41 have only one gripping arm 18, 18' or 24, 24' in each case and the container 2 is guided on the opposite side.

The invention claimed is:

1. A storage and retrieval unit for storing and removing from store containers or pallets belonging to a rack, comprising:

a first and a second endless drive element each of which are driven around two wheels arranged at a distance from each other and have an upper run and a lower run;

gripping apparatus comprising a first gripping arm pivotably engaged on the first endless drive element and a second gripping arm pivotably engaged on the second endless drive element;

a tie rod engaged between the first gripping arm and the second gripping arm, wherein the first gripping arm and the second gripping arm are each carried on a corresponding drive element to a selected position where the first gripping arm and the second gripping arm move toward each other in a lateral movement on the tie rod to grip the container or the pallet; and wherein the lateral movement is actuated by a guide rail fixed along the longitudinal length of the device between either the two wheels of the first drive element or the two wheels of the second drive element when either an end of the first gripping arm or an end of the second gripping arm is engaged by an end of the guide rail.

2. The storage and retrieval unit as claimed in claim 1, wherein the gripping arms are mounted on opposite ends of a loadbearing rod, wherein said ends are respectively fixed to the first drive element and to the second drive element.

3. The storage and retrieval unit as claimed in claim 1, wherein the lateral movement is transmitted from one gripping arm to the other gripping arm by means of the tie rod.

4. The storage and retrieval unit as claimed in claim 1, wherein each of the gripping arms has a gripping finger at a free end.

5. The storage and retrieval unit as claimed in claim 1, wherein the gripping means have at least one rod which is positioned such that the rod engages the container as the container is deposited.

6. The storage and retrieval unit as claimed in claim 5, wherein the rod is the tie rod which transmits the lateral movement.

7. The storage and retrieval unit as claimed in claim 1, wherein two gripping means are provided, which are each actuated by a guide rail.

* * * * *